(12) United States Patent
Kurita et al.

(10) Patent No.: US 7,215,533 B2
(45) Date of Patent: May 8, 2007

(54) CHIP-TYPE SOLID ELECTROLYTIC CAPACITOR

(75) Inventors: Junichi Kurita, Osaka (JP); Hiroshi Fujii, Osaka (JP); Tsuyoshi Yoshino, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/437,666

(22) Filed: May 22, 2006

(65) Prior Publication Data
US 2006/0262487 A1 Nov. 23, 2006

(30) Foreign Application Priority Data
May 23, 2005 (JP) ............................. 2005-149049
Feb. 3, 2006 (JP) ............................. 2006-026812

(51) Int. Cl.
*H01G 9/00* (2006.01)

(52) U.S. Cl. ..................... 361/523; 361/525; 361/528; 361/529; 361/534; 29/25.01; 29/25.03

(58) Field of Classification Search ............... 361/523, 361/524–525, 528–529, 532–534, 306.1, 361/306.3, 301.3, 535–538; 29/25.01, 25.03
See application file for complete search history.

(56) References Cited

U.S. PATENT DOCUMENTS

| | | | | |
|---|---|---|---|---|
| 5,424,907 | A * | 6/1995 | Kojima et al. | 361/532 |
| 6,236,561 | B1 * | 5/2001 | Ogino et al. | 361/523 |
| 6,510,045 | B2 * | 1/2003 | Mido et al. | 361/529 |
| 6,836,401 | B2 * | 12/2004 | Yoshida et al. | 361/538 |

FOREIGN PATENT DOCUMENTS

JP 6-120088 4/1994

* cited by examiner

*Primary Examiner*—Nguyen T. Ha
(74) *Attorney, Agent, or Firm*—Wenderoth, Lind & Ponack, L.L.P.

(57) ABSTRACT

A chip-type solid electrolytic capacitor has a four-terminal structure. The chip-type solid electrolytic capacitor includes capacitor elements laminated such that anode electrodes face alternately in opposite directions; a pair of anode terminals opposing each other; and a pair of cathode terminals opposing each other. The magnetic fluxes generated by current passing between respective terminals are mutually cancelled, thus allowing ESL to be drastically reduced. Further reduction of ESL is feasible by shortening the distance between the terminals as much as possible so as to reduce the current loop area.

11 Claims, 5 Drawing Sheets

CHIP-TYPE SOLID ELECTROLYTIC CAPACITOR

BACKGROUND OF THE INVENTION

1. Field of the Invention

The present invention relates to capacitors used in diverse electronic devices, and more particularly to chip-type solid electrolytic capacitors which employ conductive polymer as their solid electrolyte and are designed for surface mounting.

2. Background Art

The trend towards higher frequencies being used in electronic devices has led to growing demand for capacitors, among electronic components, that have better impedance characteristics in the higher frequency range. To meet this need, various solid electrolytic capacitors using conductive polymer with high electric conductivity as their solid electrolyte have been examined.

There is also a strong demand for smaller solid electrolytic capacitors with greater capacitance for use in peripheral circuits of the CPUs of personal computers. In parallel with higher frequencies, reduction of equivalent series resistance (ESR) is also required. Still more, as there are also strong demands for noise removal and good transient response, reduction of equivalent series inductance (ESL) of solid electrolytic capacitors is requested. Studies to meet these demands are being undertaken.

FIG. 6 is a perspective view of one of the conventional chip-type solid electrolytic capacitors disclosed in Japanese Patent Unexamined Publication No. H6-120088. FIG. 7 is a perspective view of the internal structure of this chip-type solid electrolytic capacitor. The conventional chip-type solid electrolytic capacitor has a structure in which two sheets of capacitor element 20 using conductive polymer as solid electrolyte are overlaid. This capacitor element 20 has anode 21, cathode 22, and insulating section 23, and two sheets of capacitor element 20 are overlaid such that anodes 21 protrude in opposite directions.

The conventional chip-type solid electrolytic capacitor further includes anode lead terminal 24 whose one end is coupled to anode 21 of capacitor element 20, cathode lead terminal 25 whose one end is coupled to cathode 22, and coating resin 26 molded so as to cover capacitor element 20. A pair of anode lead terminals 24 are disposed opposing each other and a pair of cathode lead terminals 25 are disposed opposing each other on the side face and bottom face of the solid electrolytic capacitor molded and covered with coating resin 26. This configures a 4-terminal solid electrolytic capacitor.

The conventional chip-type solid electrolytic capacitor as configured above has good high-frequency characteristics and noise absorbability, combined with low ESL.

However, the above conventional chip-type solid electrolytic capacitor can only suppress ESL to about 500 pH (picohenry) at the most compared to general two-terminal chip-type solid electrolytic capacitors in which one or multiple sheets of capacitor element 20 are laminated and molded with the coating resin, and anode/cathode terminals are led out. In the current market, ESL of 200 pH or below is demanded. Accordingly, the chip-type solid electrolytic capacitor shown in FIGS. 6 and 7 still does not meet this high requirement, and thus further reduction of ESL remains a pending task.

SUMMARY OF THE INVENTION

A chip-type solid electrolytic capacitor of the present invention includes a laminated capacitor element, anode lead terminals, a cathode lead terminal, and insulating coating resin. The laminated capacitor element is made by laminating multiple layers of plane capacitor elements with the anode electrode and cathode electrode, and these layers are laminated such that the anodes face alternately in opposite directions. The anode lead terminals are bonded respectively to the anode electrodes disposed at both ends of the laminated capacitor element. The cathode lead terminal is bonded to the cathode electrode disposed at the center of the laminated capacitor element. The coating resin covers the laminated capacitor element such that parts of the bottom faces of the anode lead terminals and cathode lead terminal are respectively exposed. The central section of the bottom face of the cathode lead terminal is covered with the coating resin, and both ends are exposed from the coating resin. In other words, the present invention is a 4-terminal chip-type solid electrolytic capacitor in which the anode terminals and cathode terminals are exposed at two opposing parts respectively on the bottom face, which is the mounting face.

The above structure of the chip-type solid electrolytic capacitor greatly reduces ESL.

DETAILED DESCRIPTION OF THE INVENTION

First Embodiment

Figure 1A:
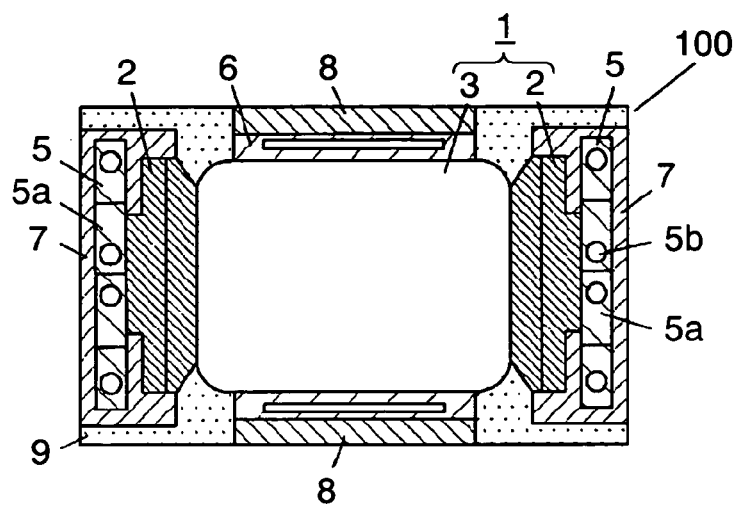
FIG. 1A is a plan perspective view of a chip-type solid electrolytic capacitor in accordance with the first embodiment of the present invention.
Figure 1B:
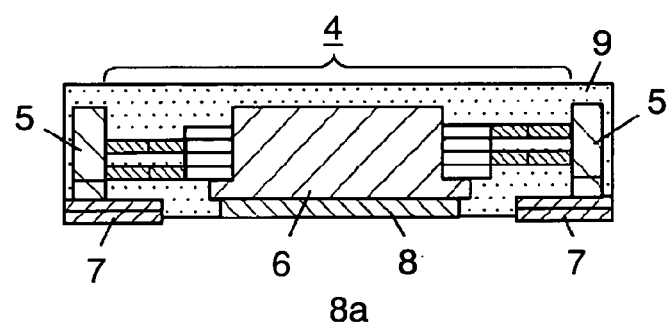
FIG. 1B is a front perspective view of the chip-type solid electrolytic capacitor in accordance with the first embodiment of the present invention.
Figure 1C:
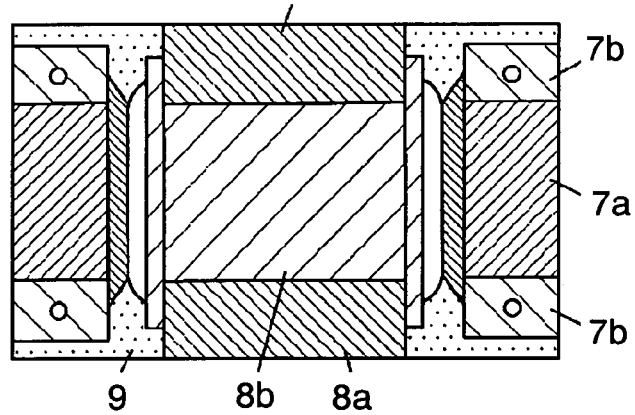
FIG. 1C is a bottom perspective view of the chip-type solid electrolytic capacitor in accordance with the first embodiment of the present invention.
Figure 1D:
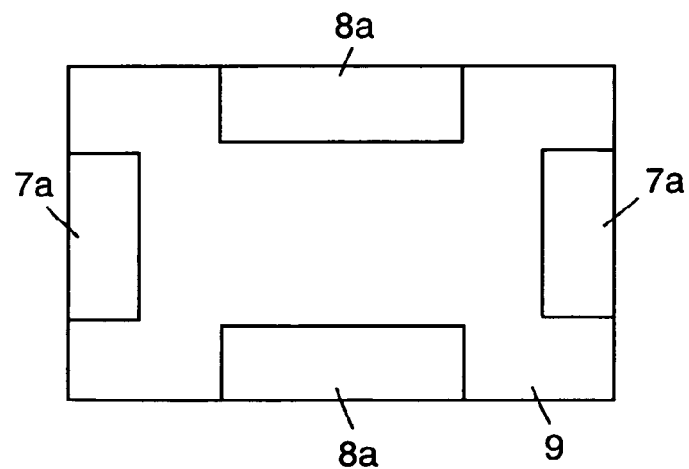
FIG. 1D is a bottom view of the chip-type solid electrolytic capacitor in accordance with the first embodiment of the present invention.

The first embodiment of the present invention is described below with reference to drawings.

FIGS. 1A to 1D illustrate chip-type solid electrolytic capacitor 100 in the first embodiment of the present invention. In FIGS. 1A to 1D, capacitor element 1 has an anode body made of valve metal whose surface is roughened. The surface of the valve metal is provided with a dielectric oxide film which is formed by anodic oxidation (so called forming). A metal forming the oxide film on the surface by anodic oxidation is called a valve metal. Anode electrode 2 and a cathode forming area (not illustrated), separated by an insulating member (not illustrated), are created at a predetermined position of the anode body. A solid electrolytic layer made of conductive polymer is formed on the dielectric oxide film layer (not illustrated) at this cathode forming area. Then, a cathode layer (not illustrated), made of carbon and silver paste, is laminated on this solid electrolytic layer to form cathode electrode 3.

Laminated capacitor element 4 is made by laminating multiple sheets of the abovementioned capacitor element 1. This laminated capacitor element 4 is configured by laminating multiple sheets (four sheets in the first embodiment) in a way such that anode electrodes 2 of capacitor elements 1 protrude alternately in opposite directions.

Anode lead frame 5 integrally bonds anode electrodes 2 of laminated capacitor element 4. Anode coupling section 5a is bonded to this anode lead frame for integration. Anode coupling section 5a is bent along the circumference of anode electrodes 2 of capacitor elements 1 such that anode coupling section 5a covers anode electrodes 2. Anode electrodes 2 and anode coupling section 5a are then bonded and integrated at welding section 5b, typically by laser-welding.

Cathode electrodes 3 of laminated capacitor element 4 are integrally bonded to cathode lead frame 6. These cathode lead frame 6 and cathode electrodes 3 are bonded using conductive adhesive (not illustrated).

Chip-type solid electrolytic capacitor 100 has anode lead terminals 7 to which anode lead frame 5 is bonded on its top face. Each anode lead terminal 7 has thin sections 7b on both ends in the width direction, and coating resin 9 is thinly formed on these thin sections 7b. A central section excluding these thin sections 7b acts as anode terminal 7a on mounting. Coating resin 9 is formed by resin coating or resin molding.

Chip-type solid electrolytic capacitor 100 further includes cathode lead terminal 8 to which aforementioned cathode lead frame 6 is bonded on its top face. Thin section 8b is provided at the center in the width direction of this cathode lead terminal 8, and coating resin 9 is thinly formed on this thin section 8b. Sections at both sides of this thin section 8b act as cathode terminals 8a on mounting.

In the first embodiment, anode lead frame 5 and anode lead terminals 7 are bonded by laser welding, and cathode lead frame 6 and cathode lead terminal 8 are bonded using conductive adhesive. However, it is apparent that the bonding means of the present invention is not limited to laser-welding and conductive adhesive.

Coating resin 9 covers chip-type solid electrolytic capacitor 100. Coating resin 9 integrally covers laminated capacitor element 4, anode lead frames 5, cathode lead frame 6, anode lead terminals 7, and cathode lead terminal 8. Furthermore, thin sections 7b and 8b, provided respectively to anode lead terminals 7 and cathode lead terminal 8, are also integrally covered with this coating resin 9. Anode terminals 7a and cathode terminals 8a are exposed on the bottom face, which becomes the mounting face, of chip-type solid electrolytic capacitor 100. Accordingly, a 4-terminal chip-type solid electrolytic capacitor 100 in which a pair of anode terminals 7a and a pair of cathode terminals 8a face each other is configured.

In chip-type solid electrolytic capacitor 100 which has the above structure, the magnetic fluxes generated by current passing between respective terminals are mutually cancelled, thus allowing ESL to be drastically reduced. Further reduction of ESL is feasible by shortening the distance between the terminals as much as possible so as to reduce the current loop area. Table 1 shows evaluation results of ESL characteristic of chip-type solid electrolytic capacitor 100 in the first embodiment (Embodiment) and evaluation results of ESL characteristic of a conventional chip-type solid electrolytic capacitor (Comparison).

TABLE 1

|  | Average ESL | Variations in ESL |
| --- | --- | --- |
| Embodiment | 98 pH | 5.20 pH |
| Comparison | 522 pH | 17.93 pH |

As shown in Table 1, chip-type solid electrolytic capacitor 100 in this embodiment can reduce ESL to about ⅕ of that of the prior art. In addition, variations in ESL are small, and a chip-type solid electrolytic capacitor that can fully satisfy the high requirement for high frequencies can be supplied.

Furthermore, the use of even numbers of laminating sheets for the above laminated capacitor element 4 achieves a preferable performance in that magnetic fluxes generated by the current passing through each of capacitor elements 4 are mutually cancelled.

Figure 2:
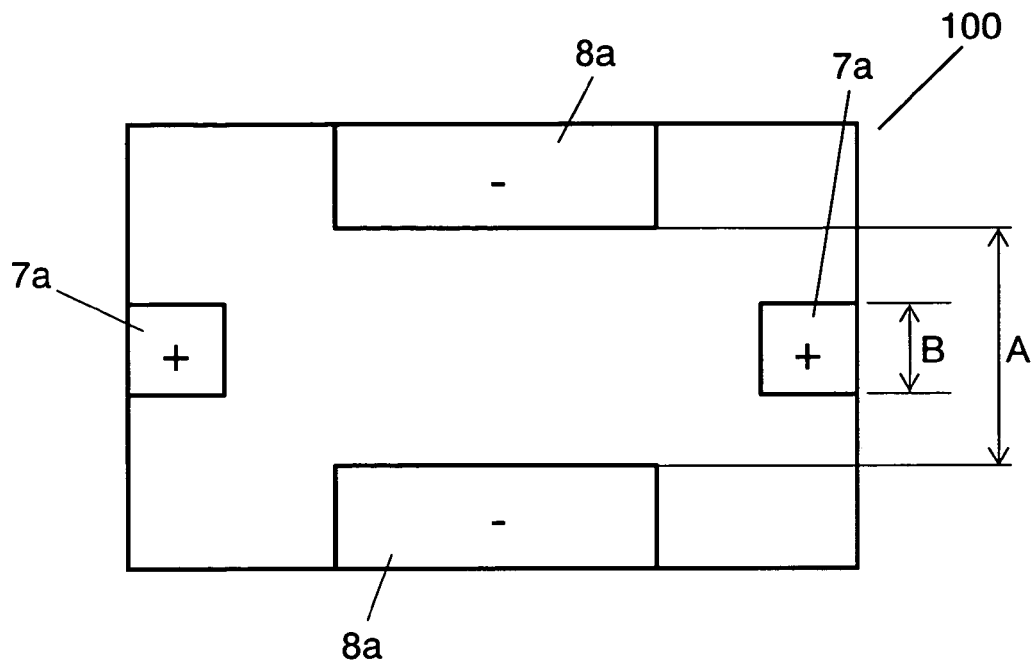
FIG. 2 is a bottom view of the chip-type solid electrolytic capacitor in accordance with the first embodiment of the present invention seen from the bottom face which becomes a mounting face.

FIG. 2 is a bottom view of chip-type solid electrolytic capacitor 100 in the first embodiment seen from the bottom face which becomes the mounting face. This chip-type solid electrolytic capacitor 100 has a four-terminal structure in which a pair of exposed anode terminals 7a and a pair of exposed cathode terminals 8a respectively oppose each other. Distance A between opposing exposed cathode terminals 8a on the bottom face and width B of anode terminal 7a in the same direction as this distance A fulfill the relation of A>B in this four-terminal structure.

Figure 3:
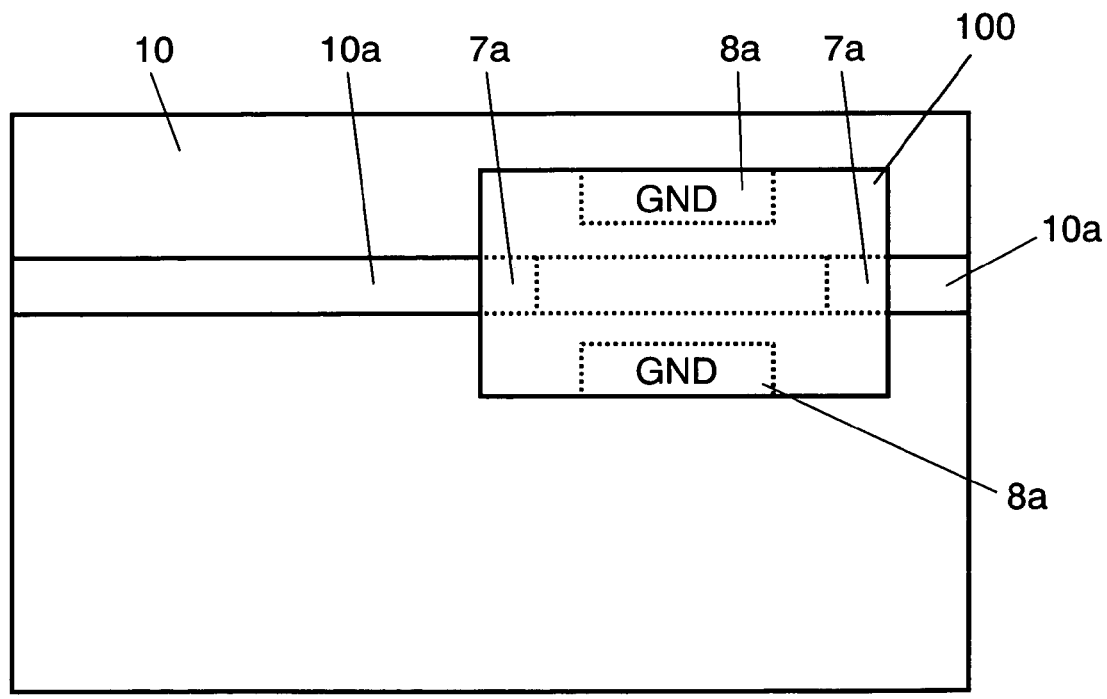
FIG. 3 is a plan view when the chip-type solid electrolytic capacitor in the first embodiment of the present invention is mounted on a printed circuit board.
Figure 4A:
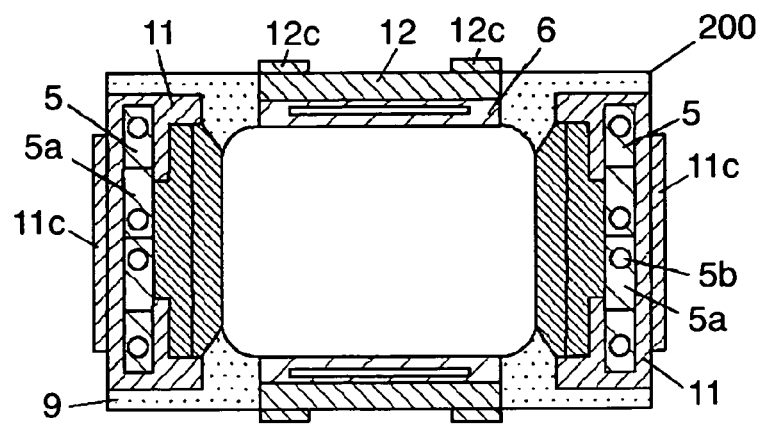
FIG. 4A is a plan perspective view of a chip-type solid electrolytic capacitor in accordance with the second embodiment of the present invention.
Figure 4B:
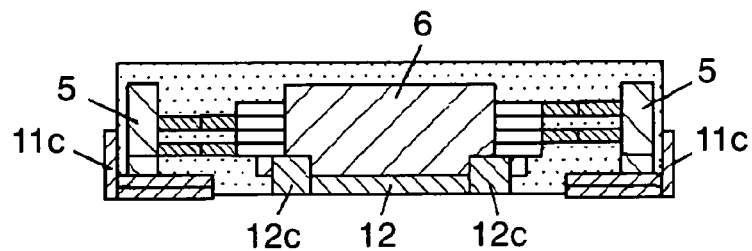
FIG. 4B is a front perspective view of the chip-type solid electrolytic capacitor in accordance with the second embodiment of the present invention.
Figure 4C:
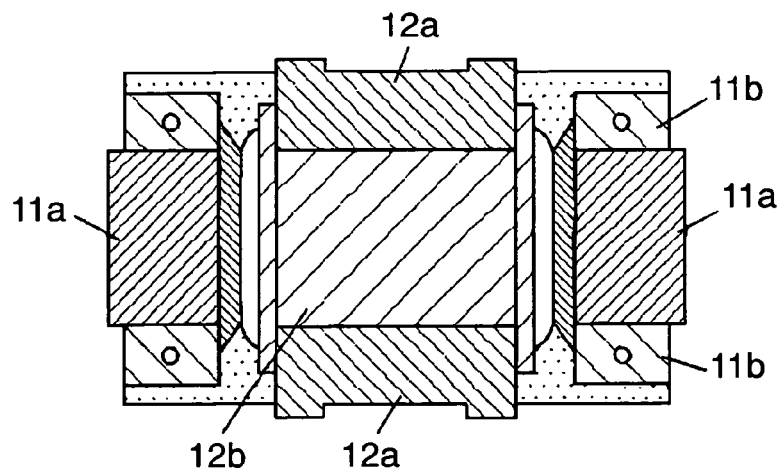
FIG. 4C is a bottom perspective view of the chip-type solid electrolytic capacitor in accordance with the second embodiment of the present invention.
Figure 4D:
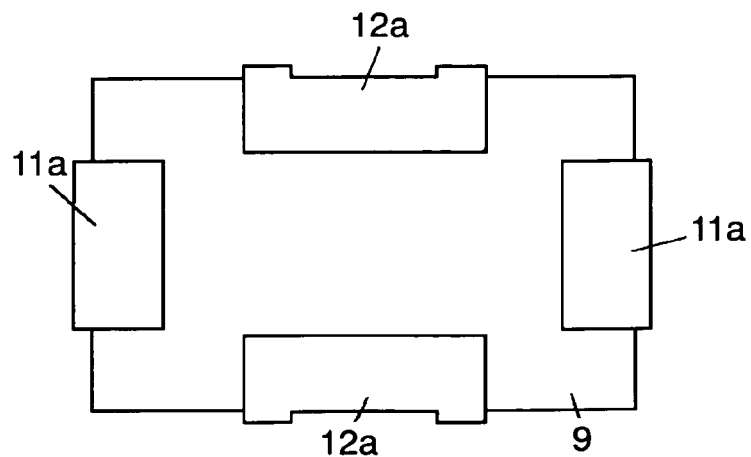
FIG. 4D is a bottom view of the chip-type solid electrolytic capacitor in accordance with the second embodiment of the present invention.
Figure 5A:
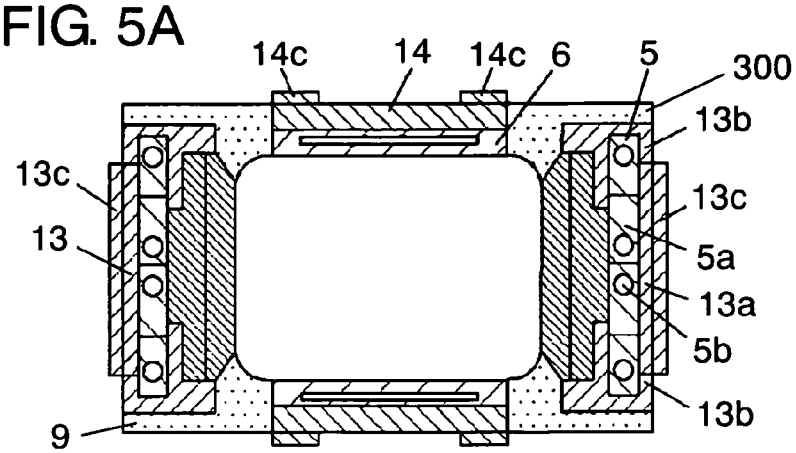
FIG. 5A is a plan perspective view of a chip-type solid electrolytic capacitor in accordance with the third embodiment of the present invention.
Figure 5B:
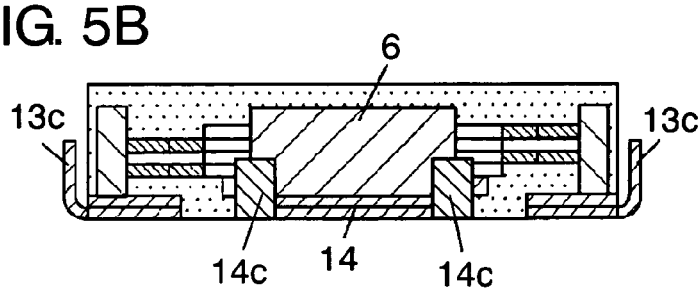
FIG. 5B is a front perspective view of the chip-type solid electrolytic capacitor in accordance with the third embodiment of the present invention.
Figure 5D:
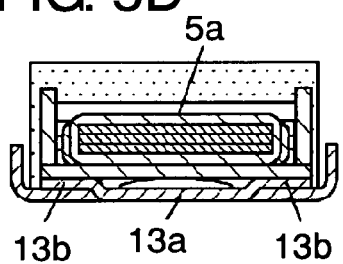
FIG. 5D is a side perspective view of the chip-type solid electrolytic capacitor in accordance with the third embodiment of the present invention.
Figure 5C:
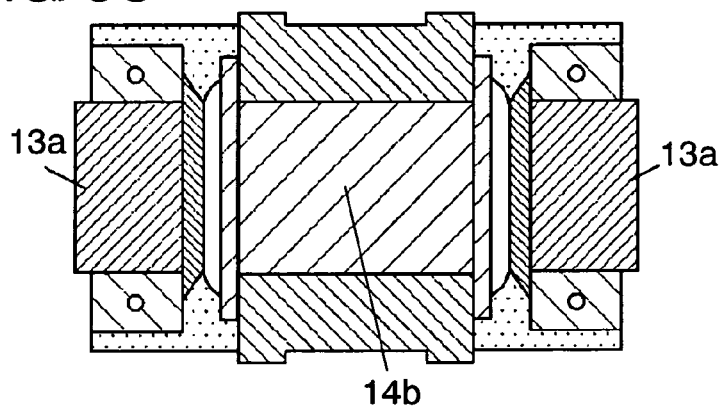
FIG. 5C is a bottom perspective view of the chip-type solid electrolytic capacitor in accordance with the third embodiment of the present invention.
Figure 5E:
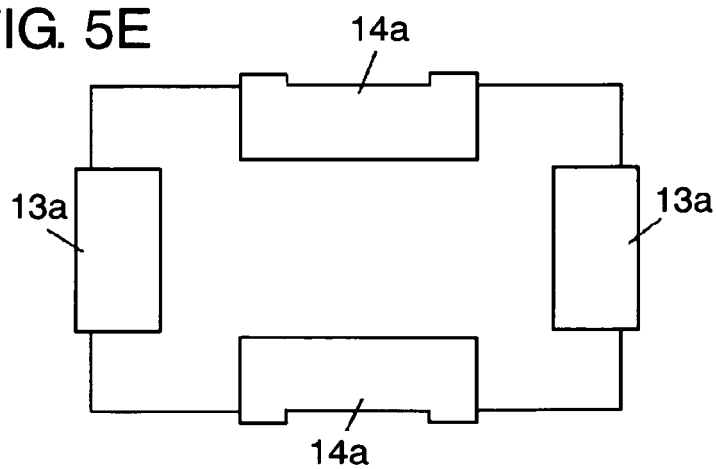
FIG. 5E is a bottom view of the chip-type solid electrolytic capacitor in accordance with the third embodiment of the present invention.
Figure 6:
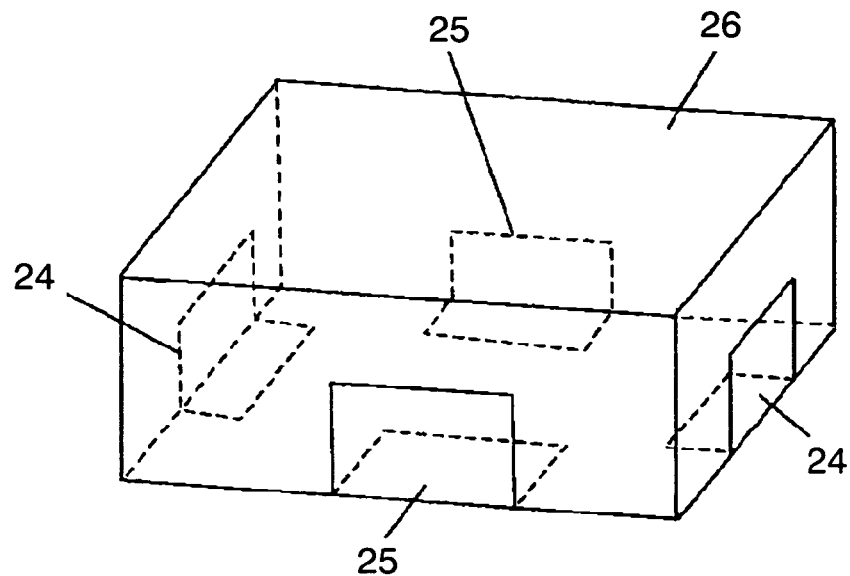
FIG. 6 is a perspective view of a conventional chip-type solid electrolytic capacitor.
Figure 7:
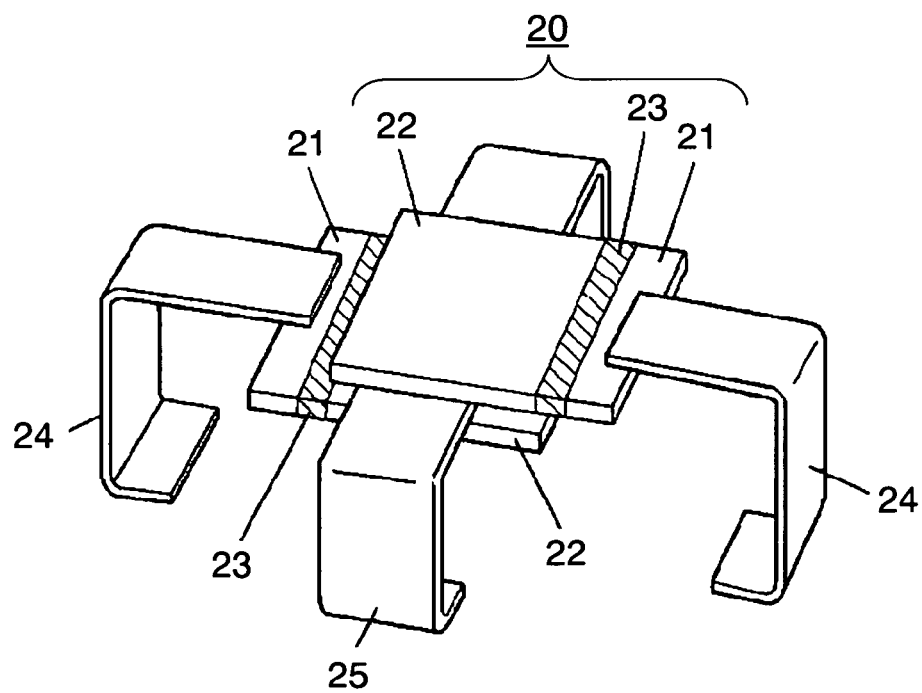
FIG. 7 is a perspective view illustrating an internal structure of the conventional chip-type solid electrolytic capacitor.

Next, the advantage of the structure shown in FIG. 2 is described with reference to FIG. 3.

Anode terminals 7a of chip-type solid electrolytic capacitor 100 in the first embodiment are coupled to power line 10a provided on printed circuit board 10, and cathode terminals 8a are coupled to ground (not illustrated). In this way, printed circuit boards identical to those used for mounting conventional chip-type solid electrolytic capacitors can be used. For mounting, distance A between cathode terminals 8a and width B of anode terminal 7a in the same direction as distance A are set to fulfill the relation of A>B such that shorting is preventable and unwanted inductance can be eliminated.

In this embodiment, multiple sheets of capacitor element 1 are bonded to anode lead frame 5 and cathode lead frame 6 so as to form laminated capacitor element 4, and chip-type solid electrolytic capacitor 100 is configured by bonding laminated capacitor element 4 to anode lead terminals 7 and cathode lead terminal 8. However, the present invention is not limited to this structure. It is apparent that a single sheet of capacitor element 1 or laminated capacitor element 4 made by laminating multiple sheets can be directly bonded to anode lead terminals 7 and cathode lead terminal 8 without using anode lead frame 5 and cathode lead frame 6. Chip-type solid electrolytic capacitors with these structures can further result in reduced cost and lower ESR. The number of sheets of capacitor element 1 to be laminated can also be determined depending on their purpose of use.

Second Embodiment

A chip-type solid electrolytic capacitor in the second embodiment has a partially different structure for the anode lead terminals and the cathode lead terminal from that described in the first embodiment. Other structures are the same as in the first embodiment, and thus for reasons of brevity the same parts are given the same reference numerals. Only parts that differ are described below with reference to drawings.

FIGS. 4A to 4D illustrate chip-type solid electrolytic capacitor 200 in the second embodiment. Chip-type solid electrolytic capacitor 200 includes anode lead terminals 11 and cathode lead terminal 12.

Each anode lead terminal 11 includes anode terminal 11a and thin sections 11b, the same as those in the first embodiment. Each thin section 11b is integrally covered with coating resin 9. As in the first embodiment, anode terminals 11a are exposed on the bottom face which becomes the mounting face. Conversely, each anode lead terminal 11 in the second embodiment has protrusion 11c extending outward from coating resin 9, as viewed from above, on at least a part of the bottom face. Still more, this protrusion 11c is bent upward along the side face of coating resin 9.

Cathode lead terminal 12 includes cathode terminal 12a and thin section 12b. This thin section 12b is integrally covered with coating resin 9. As in the first embodiment, cathode terminal 12a is exposed on the bottom face which becomes the mounting face. Cathode lead terminal 12 in the second embodiment also has protrusion 12c extending outward from coating resin 9, as viewed from above, on at least a part of the bottom face. This protrusion 12c is bent upward along the side face of coating resin 9.

Chip-type solid electrolytic capacitor 200 in the second embodiment having the above structure allows easy formation of a solder fillet. This improves soldering strength and facilitates visual checking of solder fillet from the top, resulting in improved soldering reliability.

On the side face of coating resin 9, a concave portion for fitting in protrusions 11c and 12c bent upward may be provided. This levels the surface of coating resin 9, making feasible further downsizing of the chip-type solid electrolytic capacitor.

Third Embodiment

Chip-type solid electrolytic capacitor 300 in the third embodiment has a partially different structure for the anode lead terminals and cathode lead terminal compared to chip-type solid electrolytic capacitor 200 described in the second embodiment. Other structure is the same as the second embodiment, and thus for reasons of brevity, parts are given the same reference numerals. Only parts that differ are described below with reference to drawings.

FIGS. 5A to 5E illustrate chip-type solid electrolytic capacitor 300 in the third embodiment. Chip-type solid electrolytic capacitor 300 includes anode lead terminals 13 to which anode lead frame 5 is bonded on its top face. Each anode lead terminal 13 includes bent sections 13b made by bending both ends of a single substrate in the width direction. A central section excluding these bent sections 13b acts as anode terminal 13a on mounting chip-type solid electrolytic capacitor 300. Each anode lead terminal 13 also includes protrusions 13c extending outward protruding from coating resin 9 on at least a part of the bottom face. These protrusions 13c are bent upward along the side face of coating resin 9.

Chip-type solid electrolytic capacitor 300 further includes cathode lead terminal 14 to which cathode lead frame 6 is bonded on its top face. This cathode lead terminal 14 includes bent section 14b made by bending a central section of a substrate in the width direction. Both ends excluding this bent section 14b act as cathode terminals 14a on mounting. Cathode lead terminal 14 includes protrusions 14c extending outward from coating resin 9. These protrusions 14c are bent upward along the side face of coating resin 9.

Chip-type solid electrolytic capacitor 300 in the third embodiment allows easy formation of a solder fillet, and thus soldering strength is improved. It also facilitates visual checking of solder filet from the top, improving soldering reliability. In chip-type solid electrolytic capacitor 300 in the third embodiment, anode lead terminals 13 and cathode lead terminal 14 can also be manufactured at low cost. This minimizes cost increase while achieving low ESL.

As described in detail using the first to third embodiments, the chip-type solid electrolytic capacitor of the present invention includes capacitor elements laminated such that the anode terminals protrude alternately in opposite directions. In addition, a pair of anode terminals opposing each other and a pair of cathode terminals opposing each other are disposed on the bottom face, which becomes the mounting face, so as to configure a four-terminal chip-type solid electrolytic capacitor. With this structure of the present invention, the magnetic fluxes generated by the current passing between respective terminals are mutually cancelled, permitting ESL to be drastically reduced. ESL can be further reduced by shortening the distance between terminals as much as possible so as to reduce the current loop area. Accordingly, this chip-type solid electrolytic capacitor is useful in fields that require capacitors with high frequency response.

It will be obvious to those skilled in the art that various changes may be made in the above-described embodiments of the present invention. However, the scope of the present invention is determined by the following claims.

What is claimed is:

1. A chip-type solid electrolytic capacitor having a four-terminal structure, the chip-type solid electrolytic capacitor comprising:

a laminated capacitor element in which a plurality of plane capacitor elements, each having an anode electrode and a cathode electrode, are laminated such that the anode electrodes are disposed alternately in opposite directions;

a pair of anode lead terminals bonded to the anode electrodes in opposite directions;

a cathode lead terminal bonded to the cathode electrodes, the cathode lead terminal having a pair of cathode terminals disposed in two directions perpendicular to the pair of anode lead terminals; and coating resin covering an entire circumference of the laminated capacitor element except for parts of the anode lead terminals and the cathode lead terminal which are left exposed;

wherein, the anode lead terminals and the cathode lead terminal are exposed from the coating resin on a bottom face of the chip-type solid electrolytic capacitor;

a central section of the cathode lead terminal is thinner than both edges thereof, and this central section is covered with the coating resin; and a pair of cathode terminals which are exposed sections of the cathode lead terminal and a pair of anode terminals which are exposed sections of the anode lead terminals are disposed on the bottom face.

2. The chip-type solid electrolytic capacitor according to claim 1, wherein for each of the anode lead terminals, both edge sections thereof are thinner thhan a central section thereof;

the edge sections of each of the anode lead terminals are covered with the coating resin; and the central sections of the anode lead terminals exposed from the coating resin act as the pair of anode terminals.

3. The chip-type solid electrolytic capacitor according to claim 2, wherein distance A between the pair of cathode terminals and width B of the anode terminals in a same direction as distance A fulfill a relation of A>B.

4. The chip-type solid electrolytic capacitor according to claim 1, wherein, each of the anode lead terminals is formed by a single bent sheet of substrate;

the anode terminals are exposed sections of the anode lead terminals on the bottom face of the chip-type solid electrolytic capacitor;

the cathode lead terminal is formed by a single bent substrate; and the cathode terminals are exposed sections of the cathode lead terminal on the bottom face of the chip-type solid electrolytic capacitor.

5. The chip-type solid electrolytic capacitor according to claim 2, wherein each of the anode lead terminals is formed by a single bent sheet of substrate;

the anode terminals are exposed sections of the anode lead terminals on the bottom face of the chip-type solid electrolytic capacitor;

the cathode lead terminal is formed by a single bent substrate; and the cathode terminals are exposed sections of the cathode lead terminal on the bottom face of the chip-type solid electrolytic capacitor.

6. The chip-type solid electrolytic capacitor according to claim 1, wherein each of the anode lead terminals and the cathode lead terminal has a protruding section protruding from the coating resin on the bottom face, and the protruding section is bent upward along a side face of the coating resin.

7. The chip-type solid electrolytic capacitor according to claim 6, wherein the coating resin has a concave portion so as to house a portion of each of the anode lead terminals and the cathode lead terminal bent upward.

8. The chip-type solid electrolytic capacitor according to claim 1 further comprising:

an anode lead frame for integrally bonding a plurality of the anode electrodes, the anode lead frame being coupled to the anode lead terminals; and a cathode lead frame for integrally bonding a plurality of the cathode electrodes, the cathode lead frame being coupled to the cathode lead terminal.

9. The chip-type solid electrolytic capacitor according to claim 8 further comprising an anode coupling section for covering the anode electrodes along a circumference of the anode electrodes, wherein the anode coupling section is bonded to the anode lead frame.

10. The chip-type solid electrolytic capacitor according to claim 1, wherein the laminated capacitor element has an even number of layers of the capacitor element.

11. The chip-type solid electrolytic capacitor according to claim 1, wherein each of the plane capacitor elements comprises:

an anode body made of valve metal wherein a dielectric oxide film is formed on a roughed surface of the valve metal;

an insulating section formed on a predetermined part of the anode body; and the anode electrode and cathode electrode formed on both sides of the insulating section; and the cathode electrode comprising:

a solid electrolytic layer made of conductive polymer, the solid electrolytic layer formed on the dielectric oxide film; and a cathode layer made of carbon and silver paste, the cathode layer being laminated on the solid electrolytic layer.

* * * * *

UNITED STATES PATENT AND TRADEMARK OFFICE
CERTIFICATE OF CORRECTION

| | | |
|---|---|---|
| PATENT NO. | : 7,215,533 B2 | Page 1 of 1 |
| APPLICATION NO. | : 11/437666 | |
| DATED | : May 8, 2007 | |
| INVENTOR(S) | : Junichi Kurita et al. | |

It is certified that error appears in the above-identified patent and that said Letters Patent is hereby corrected as shown below:

IN THE CLAIMS

Column 7, line 28, change "thinner, thhan" to --thinner than--.

Signed and Sealed this

Seventh Day of August, 2007

JON W. DUDAS
*Director of the United States Patent and Trademark Office*